(12) United States Patent
Horowitz

(10) Patent No.: US 8,780,970 B2
(45) Date of Patent: Jul. 15, 2014

(54) MOTION WAKE IDENTIFICATION AND CONTROL MECHANISM

(75) Inventor: Michael Horowitz, Austin, TX (US)

(73) Assignee: Polycom, Inc., San Jose, CA (US)

( * ) Notice: Subject to any disclaimer, the term of this patent is extended or adjusted under 35 U.S.C. 154(b) by 3747 days.

(21) Appl. No.: 10/328,330

(22) Filed: Dec. 23, 2002

(65) Prior Publication Data

US 2003/0161402 A1 Aug. 28, 2003

Related U.S. Application Data

(60) Provisional application No. 60/343,270, filed on Dec. 21, 2001.

(51) Int. Cl.
*H04B 1/66* (2006.01)

(52) U.S. Cl.
USPC .......................................................... 375/240

(58) Field of Classification Search
USPC .................. 375/240, 240.16, 240.12, 240.03, 375/240.14, 240.26, 240.24, 240.29; 348/699, 416.1; 382/233
See application file for complete search history.

(56) References Cited

U.S. PATENT DOCUMENTS

| | | | | |
|---|---|---|---|---|
| 4,951,140 A * | 8/1990 | Ueno et al. | ................. | 348/413.1 |
| 5,247,363 A * | 9/1993 | Sun et al. | ....................... | 348/616 |
| 5,508,744 A * | 4/1996 | Savatier | .................... | 375/240.16 |
| 5,537,155 A * | 7/1996 | O'Connell et al. | ............ | 348/699 |
| 5,790,207 A * | 8/1998 | Jung | ............................. | 348/699 |
| 5,995,668 A * | 11/1999 | Corset et al. | .................. | 382/233 |
| 6,208,693 B1 * | 3/2001 | Chen et al. | .............. | 375/240.24 |
| 6,348,954 B1 * | 2/2002 | Takishima et al. | ............ | 348/699 |
| 6,459,732 B2 * | 10/2002 | Chen et al. | .............. | 375/240.08 |
| 6,480,615 B1 | 11/2002 | Sun et al. | ....................... | 382/103 |
| 6,489,995 B1 * | 12/2002 | Kok et al. | .................. | 348/416.1 |
| 6,618,444 B1 * | 9/2003 | Haskell et al. | ............ | 375/240.24 |
| 6,690,729 B2 * | 2/2004 | Hayashi | .................. | 375/240.16 |
| 6,700,934 B2 * | 3/2004 | Lin | .......................... | 375/240.16 |
| 6,983,016 B2 * | 1/2006 | Hourunranta | ............ | 375/240.12 |
| 7,095,786 B1 * | 8/2006 | Schonfeld et al. | ........ | 375/240.16 |
| 7,187,803 B2 * | 3/2007 | Hanami | ........................ | 382/236 |
| 2001/0017887 A1 * | 8/2001 | Furukawa et al. | ........ | 375/240.03 |
| 2002/0114394 A1 | 8/2002 | Ma | ............................. | 375/240.16 |
| 2003/0039312 A1 * | 2/2003 | Horowitz et al. | ......... | 375/240.24 |
| 2003/0053543 A1 * | 3/2003 | Bhaumik et al. | .......... | 375/240.16 |

\* cited by examiner

*Primary Examiner* — Tung Vo
(74) *Attorney, Agent, or Firm* — Wong, Cabello, Lutsch, Rutherford & Brucculeri, L.L.P.

(57) ABSTRACT

The present invention provides a system and method for detecting macroblocks of a video frame that are located in one or more motion wake regions of the video frame. In one embodiment, a motion wake engine is configured to select a subset of macroblocks comprising non-peripherally located macroblocks selected to be inter-coded with motion vector magnitudes less than a predetermined motion vector threshold. Then, the motion wake engine identifies which macroblocks of the subset of macroblocks are located in first, second, third, or fourth motion wake regions of the video frame based upon a motion vector analysis of nearest neighbor macroblocks. In another embodiment of the invention, the motion wake engine applies error concealment/video improvement techniques to the identified macroblocks for video error concealment and for reducing visual artifacts associated with the motion wake regions.

33 Claims, 6 Drawing Sheets

| Format | Resolution (pixels/line x lines/frame) | Bit Rate at 30 fps (Mbps) |
|---|---|---|
| SQCIF (Sub Quarter CIF) | 128 x 96 | 4.4 |
| QCIF (Quarter CIF) | 176 x 144 | 9.1 |
| CIF | 352 x 288 | 36.5 |
| 4CIF (4 x CIF) | 704 x 576 | 146.0 |
| 16CIF (16 x CIF) | 1408 x 1152 | 583.9 |

FIG. 1
Prior Art

MOTION WAKE IDENTIFICATION AND CONTROL MECHANISM

CROSS REFERENCE TO RELATED APPLICATIONS

This application claims the benefit of Provisional Patent Application Ser. No. 60/343,270, filed Dec. 21, 2001, entitled "Motion Wake Identification and Control Mechanism," which is incorporated herein by reference. In addition, this application is related to patent application Ser. No. 10/226,504, filed Aug. 23, 2002, entitled "System and Method for Video Error Concealment."

BACKGROUND OF THE INVENTION

1. Field of the Invention

This present invention relates generally to video communication, and more particularly to motion wake identification for video error concealment.

2. Description of Related Art

Video images have become an increasingly important part of global communication. In particular, video conferencing and video telephony have a wide range of applications such as desktop and room-based conferencing, video over the Internet and over telephone lines, surveillance and monitoring, telemedicine, and computer-based training and education. In each of these applications, video and accompanying audio information is transmitted across telecommunication links, including telephone lines, ISDN, DSL, and radio frequencies.

A standard video format used in video conferencing is Common Intermediate Format (CIF), which is part of the International Telecommunications Union (ITU) H.261 videoconferencing standard. Additional formats with resolutions higher and lower than CIF have also been established. FIG. 1 is a table of the resolution and bit rate requirements for various video formats under an assumption that 12 bits are required, on average, to represent one pixel. The bit rates (in megabits per second, Mbps) shown are for uncompressed color video frames.

Presently, efficient transmission and reception of video signals may require encoding and compression of video and accompanying audio data. Video compression coding is a method of encoding digital video data such that less memory is required to store the video data and a required transmission bandwidth is reduced. Certain compression/decompression (CODEC) schemes are frequently used to compress video frames to reduce required transmission bit rates. Thus, CODEC hardware and software allow digital video data to be compressed into a more compact binary format than required by the original (i.e., uncompressed) digital video format.

Several conventional approaches and standards to encoding and compressing source video signals exist. Some standards are designed for a particular application such as JPEG (Joint Photographic Experts Group) for still images and H.261, H.263, MPEG (Moving Pictures Experts Group), MPEG-2, and MPEG-4 for moving images. The coding standards for moving images, typically, use block-based motion-compensated prediction on 16×16 pixels, commonly referred to as macroblocks. In one embodiment, a macroblock is a unit of information containing four 8×8 blocks of luminance data and two corresponding 8×8 blocks of chrominance data in accordance with a 4:2:0 chroma sampling structure, where the chrominance data is subsampled 2:1 in both vertical and horizontal directions.

For applications in which audio accompanies video, as a practicality, audio data also must be compressed, transmitted, and synchronized along with the video data. Multiplexing and protocol issues are covered by standards such as H.320 (ISDN-based video conferencing), H.324 (POTS-based video telephony), and H.323 (LAN or IP-based video conferencing). H.263 (or its predecessor, H.261) provides the video coding part of these standards groups.

A motion estimation and compensation scheme is one conventional method typically used for reducing transmission bandwidth requirements for a video signal. Because the macroblock is the basic data unit, the motion estimation and compensation scheme may compare a given macroblock in a current video frame with the given macroblock's surrounding area in a previously transmitted video frame called a reference frame, and attempt to find a close data match. If a close data match is found, the scheme subtracts the given macroblock in the current video frame from the closely matched, offset macroblock in the previously transmitted reference video frame so that only a difference (i.e., residual) and the spatial offset needs to be encoded and transmitted. The spatial offset is commonly referred to as a motion vector. If the motion estimation and compensation process is efficient, the remaining residual macroblock should contain a small amount of information thereby leading to efficient compression.

Video data may be transmitted over packet switched communication networks or on heterogeneous communications networks in which one of the endpoints is associated with a circuit-switched network, and a gateway or other packet-switched to circuit switched network bridging device is used. When preparing video frame information for transmission over a packet switched communication network, encoding schemes transform the video frame information, compressed by motion estimation and compensation techniques or other compression schemes into data packets for transmission across the communication network. Data packets are sometimes lost, corrupted, or delayed which can introduce errors resulting in video quality degradation.

In particular, motion prediction errors resulting from corrupted or lost data packets tend to be persistent in motion wake regions of video frames. A motion wake region of a video frame is a region where a moving object has uncovered a part of a stationary or near-stationary background. Errors located in a given motion wake region can propagate to other regions of the video frame, increase in magnitude, and cause distracting visual artifacts.

Therefore, there is a need for a system and a method to identify macroblocks located in motion wake regions for reducing visual artifacts caused by motion prediction errors, thereby improving video quality.

SUMMARY OF THE INVENTION

The present invention reduces video error generation, persistence, propagation, and amplification caused by errors associated with corrupted or lost inter-coded macroblocks located in motion wake regions of video frames. In general, the present invention provides a system and method that determines which macroblocks of a video frame are located in one or more motion wake regions of the video frame.

In an exemplary embodiment, a coding engine is provided for processing a frame of a video signal to generate macroblocks, encoding the macroblocks as intra-coded and inter-coded macroblocks, and passing the encoded macroblocks to a motion wake engine. In a further exemplary embodiment of the present invention, the motion wake engine is configured to select a subset of the encoded macroblocks of the video frame based upon macroblock properties such as encoding types, locations within the video frame, and motion vector magnitudes. Then, the motion wake engine determines which macroblocks of the subset of macroblocks are located in motion wake regions of the video frame based upon motion vector analysis of nearest neighbor macroblocks.

In another embodiment, a coding engine is provided for processing a frame of a video signal to generate macroblocks, performing motion estimation and mode analysis on the macroblocks, and passing the macroblocks to a motion wake engine. That is, the coding engine generates at least one motion vector for each macroblock, and designates each macroblock as inter-coded or intra-coded. In a further exemplary embodiment of the present invention, the motion wake engine is configured to select a subset of the macroblocks of the video frame based upon macroblock properties such as designated encoding types, locations within the video frame, and motion vector magnitudes. Then, the motion wake engine determines which macroblocks of the subset of the macroblocks are located in motion wake regions of the video frame based upon motion vector analysis of nearest neighbor macroblocks. Finally, the motion wake engine intra-codes those macroblocks located in the motion wake regions of the video frame, over-riding the designated encoding types associated with the motion wake region macroblocks. In another embodiment, the coding engine intra-codes those macroblocks located in the motion wake regions of the video frame, over-riding the designated encoding types associated with the motion wake region macroblocks.

In another embodiment of the invention, a motion wake engine generates macroblocks from a video signal, performs motion estimation and mode analysis on the macroblocks, determines which macroblocks are located in motion wake regions of the video frame, intra-codes those macroblocks located in the motion wake regions, and encodes macroblocks not located in motion wake regions based upon the mode analysis.

In one embodiment of the present invention, the subset of macroblocks include non-peripherally located, inter-coded macroblocks, where each non-peripherally located, inter-coded macroblock has a motion vector magnitude less than a predetermined motion vector threshold. For future reference, a macroblock that is designated as inter-coded and a macroblock that is designated as intra-coded will be referred to as an inter-coded macroblock and an intra-coded macroblock, respectively. In an additional embodiment, the predetermined motion vector threshold is one pixel.

In further embodiments of the present invention, a macroblock of the subset of macroblocks is located in a first motion wake region of the video frame if more than one of the nearest neighbor macroblocks located in a positive x direction with respect to the macroblock has a significant displacement in the positive x direction with respect to an x-displacement of the macroblock. Alternatively, the macroblock of the subset of macroblocks is located in a second motion wake region if more than one of the nearest neighbor macroblocks located in a positive y direction with respect to the macroblock has a significant displacement in the positive y direction with respect to a y-displacement of the macroblock. In yet a further embodiment, the macroblock is located in a third motion wake region if more than one of the nearest neighbor macroblocks located in a negative x direction with respect to the macroblock has a significant displacement in the negative x direction with respect to an x-displacement of the macroblock. Finally, the macroblock is located in a fourth motion wake region if more than one of the nearest neighbor macroblocks located in a negative y direction with respect to the macroblock has a significant displacement in the negative y direction with respect to a y-displacement of the macroblock.

In a further embodiment of the present invention, the motion wake engine detects that a macroblock is located in any of a first, second, third, or fourth motion wake region, and forces an intra-code mode decision for the macroblock. Intra-coding of motion wake region macroblocks reduces visual artifacts due to errors associated with lost or corrupted macroblocks located in motion wake regions. Alternatively, in another embodiment of the present invention, a quantization parameter (QP) associated with the motion wake region inter-coded macroblocks is reduced. While reducing the QP of inter-coded macroblocks identified as being in the motion wake does not provide error resilience, it is an effective tool for cleaning up uncovered background in the motion wake due to a greater accuracy of macroblock content resulting from reducing the QP.

BRIEF DESCRIPTION OF THE DRAWINGS

FIG. 1 is a table of the resolution and bit rate requirements for various video formats, according to the prior art;

DETAILED DESCRIPTION OF THE DRAWINGS

The present invention identifies macroblocks located in motion wake regions of video frames, and reduces visual artifacts associated with the macroblocks located in the motion wake regions by application of error concealment techniques. These improvements seek to attenuate the disturbances caused by data packet loss or corruption across a communication link. The scope of the present invention covers a variety of video standards, including, but not limited to, H.261, H.263, H.264, MPEG, MPEG-2, and MPEG-4.

Figure 2:
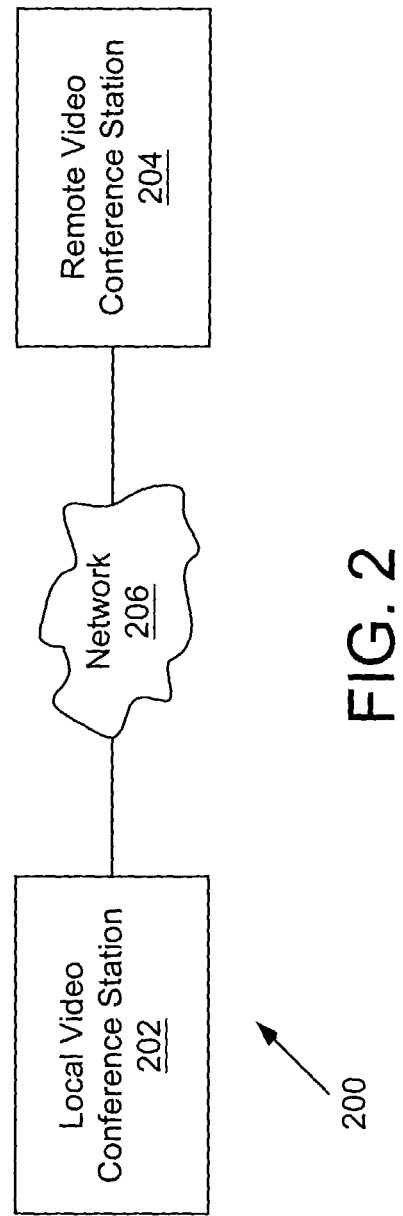
FIG. 2 is a block diagram of an exemplary video conferencing system, according to the present invention.

FIG. 2 illustrates an exemplary video conferencing system 200. The video conferencing system 200 includes a local video conference station 202 and a remote video conference station 204 connected through a network 206. Although FIG. 2 only shows two video conference stations 202 and 204, those skilled in the art will recognize that more video conference stations may be coupled to the video conferencing system 200. It should be noted that the present system and method may be utilized in any communication system where video data is transmitted over a network. The network 206 may be any type of electronic transmission medium, such as, but not limited to, POTS, cable, fiber optic, and radio transmission media.

Figure 3:
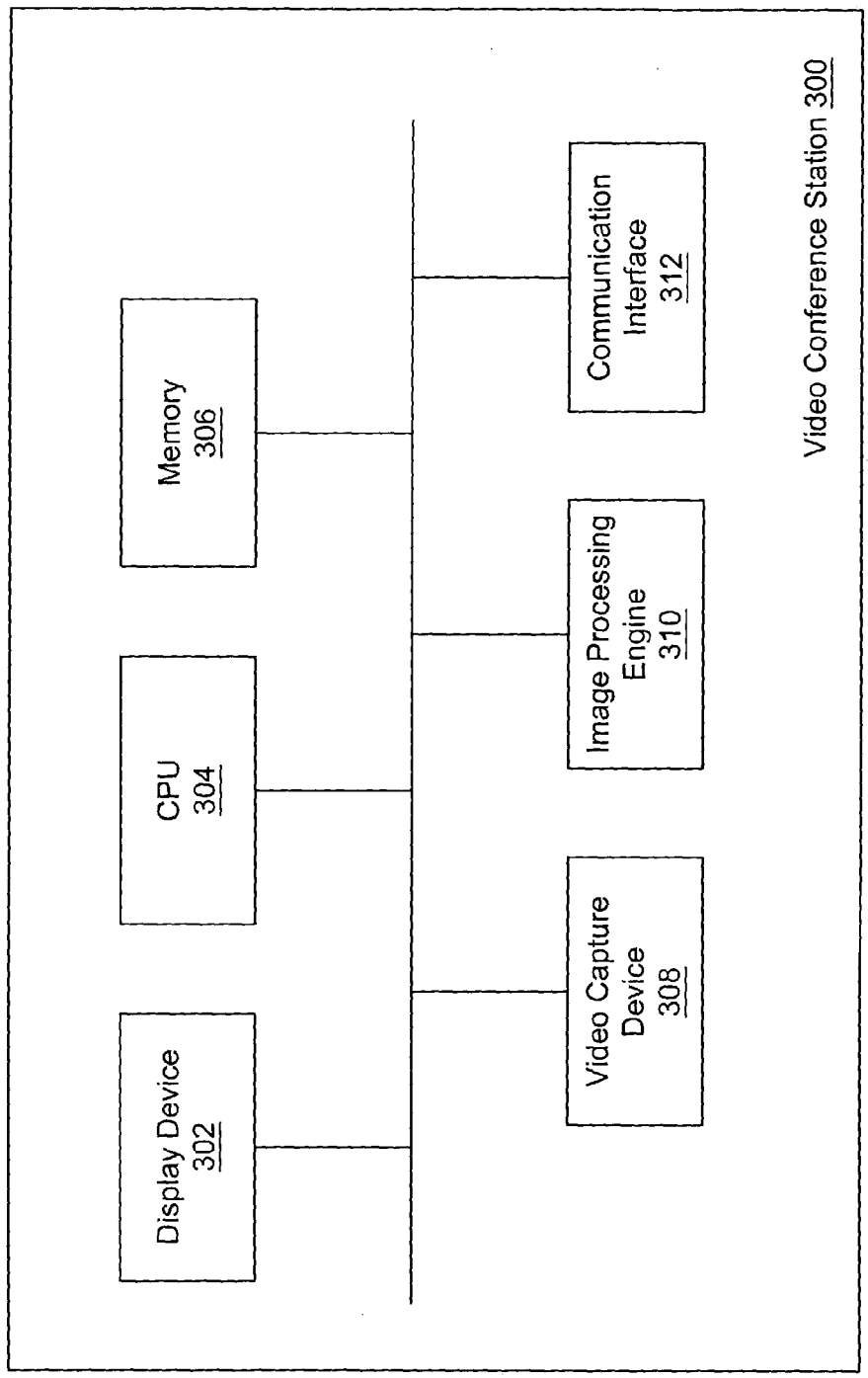
FIG. 3 is a block diagram of an exemplary video conference station of the video conferencing system of FIG. 2.

FIG. 3 is a block diagram of an exemplary video conference station 300. For simplicity, the video conference station 300 will be described as the local video conference station 202 (FIG. 2), although the remote video conference station 204 (FIG. 2) may contain a similar configuration. In one embodiment, the video conference station 300 includes a display device 302, a CPU 304, a memory 306, at least one video capture device 308, an image processing engine 310, and a communication interface 312. Alternatively, other devices may be provided in the video conference station 300, or not all above named devices provided. The at least one video capture device 308 may be implemented as a charge coupled device (CCD) camera, a complementary metal oxide semiconductor (CMOS) camera, or any other type of image capture device. The at least one video capture device 308 captures images of a user, conference room, or other scenes, and sends the images to the image processing engine 310. When encoded video is sent on a packet switched network, the image processing engine 310 processes the video image into data packets before the communication interface 312 transmits the data packets to the remote video conference station 204. The image processing engine 310 will be discussed in more detail in connection with FIG. 4. Conversely, the image processing engine 310 also transforms received data packets from the remote video conference station 204 into a video signal for display on the display device 302.

Figure 4:
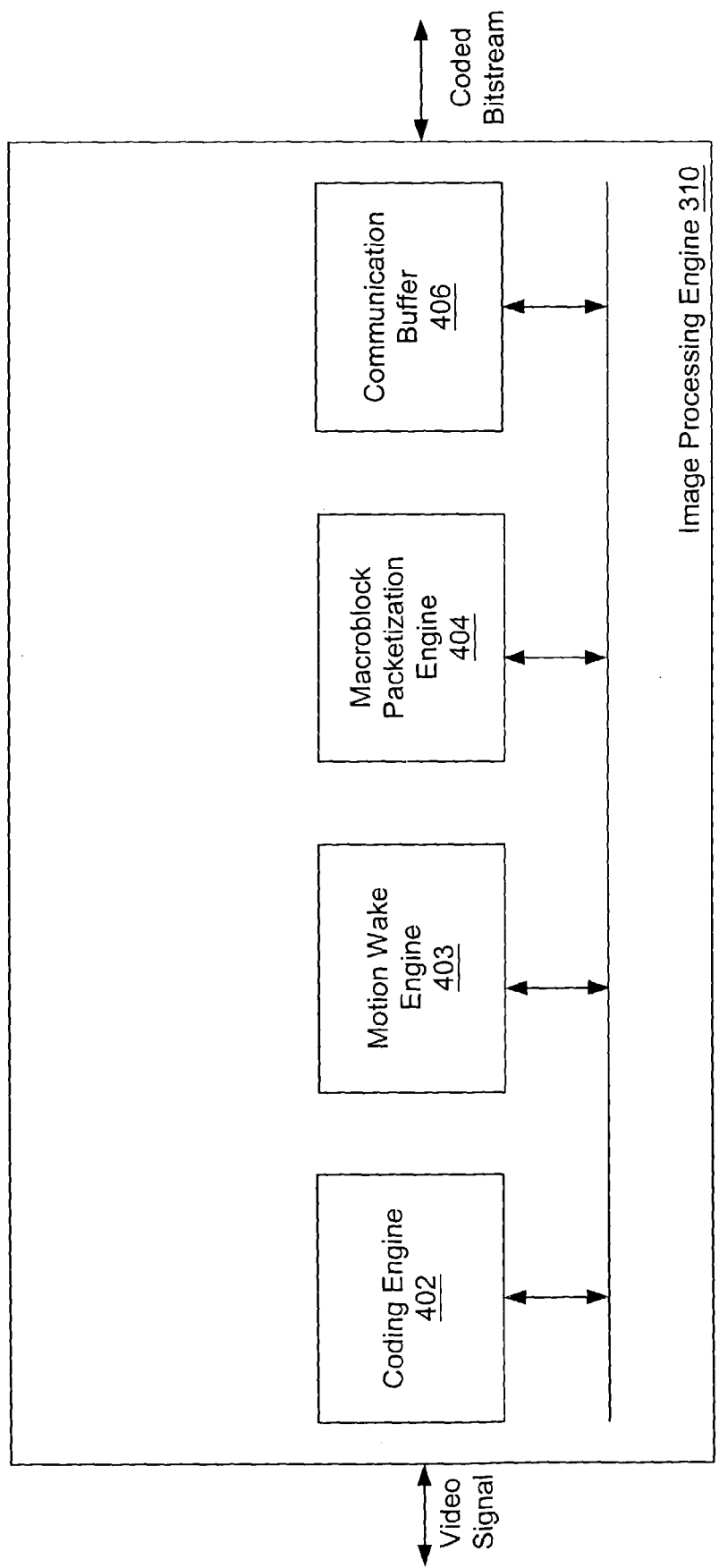
FIG. 4 is a block diagram of an exemplary embodiment of the image processing engine of FIG. 3.

FIG. 4 is an exemplary embodiment of the image processing engine 310 of FIG. 3. The image processing engine 310 includes a coding engine 402, a motion wake engine 403, a macroblock packetization engine 404, and a communication buffer 406. In other embodiments of the invention, the macroblock packetization engine 404 may be absent or may be incorporated in the coding engine 402, or the image processing engine 310 may include more or less elements.

Initially, a video signal from the video capture device 308 (FIG. 3) enters the coding engine 402, which converts each frame of video into a desired format, and transforms each frame of the video signal into a set of macroblocks. A macroblock is a data unit that contains blocks of data comprising luminance and chrominance components associated with picture elements (also referred to as pixels). For example, in H.263, a macroblock consists of four 8×8 blocks of luminance data and two corresponding 8×8 blocks of chrominance data in a 4:2:0 chroma sampling format. An 8×8 block of data is an eight-column by eight-row matrix of data, where each data corresponds to a pixel of the video frame. A 4:2:0 chroma formatted macroblock comprises data covering a 16 pixel by 16 pixel section of the video frame. However, the present invention is not limited to macroblocks as conventionally defined, but may be extended to any data unit comprising luminance and/or chrominance data. In addition, the scope of the present invention covers other sampling formats, such as a 4:2:2 chroma sampling format comprising four 8×8 blocks of luminance data and four corresponding 8×8 blocks of chrominance data, or a 4:4:4 chroma sampling format comprising four 8×8 blocks of luminance data and eight corresponding 8×8 blocks of chrominance data.

In addition, the coding engine 402 encodes (i.e., compresses) each macroblock to reduce the number of bits used to represent data content. Each macroblock may be "intra-coded" or "inter-coded," and a video frame may be comprised of any combination of intra-coded and inter-coded macroblocks. Inter-coded macroblocks are encoded using temporal similarities (i.e., similarities that exist between a macroblock from one frame and a closely matched macroblock from a previously coded frame). Specifically, a given inter-coded macroblock comprises encoded differences between the given macroblock and the closely matched macroblock from the previous reference video frame. The closely matched macroblock from the previous reference video frame may comprise data associated with pixels that are spatially offset from the pixels associated with the given macroblock. Alternatively, intra-coded macroblocks are encoded without use of information from other video frames.

For example, to determine if a given macroblock may be encoded as an inter-coded macroblock, the coding engine 402 computes differences between data of the given macroblock of a current video frame with data of a macroblock from a previous (or subsequent as in the case of bi-directionally predicted frame coding) reference video frame (referred to as an offset macroblock), where the differences may be realized, for example, by a mean-absolute error or a mean-squared error between data corresponding to pixels located at co-located positions within the macroblocks. For the given macroblock, the coding engine 402 computes errors for a plurality of spatially offset macroblocks. If the coding engine 402 only finds errors greater than a predetermined coding threshold, then significant similarities do not exist between data from the given macroblock and data from the previous frame, and the macroblock is intra-coded. However, if one error is found to be less than the predetermined coding threshold for the given macroblock and a given offset macroblock from the previous frame, then the given macroblock is inter-coded. The scope of the present invention covers other types of selection criteria to determine whether a given macroblock is intra-coded or inter-coded.

To inter-code the given macroblock, the coding engine 402 performs a series of steps. For example, the coding engine 402 first subtracts the given macroblock's data from the offset macroblock's data (i.e., luminance and chrominance data associated with a pixel of the given macroblock is subtracted, respectively, from luminance and chrominance data associated with a corresponding pixel of the offset macroblock for every pixel) to give difference data. Next, the coding engine 402 encodes the difference data using standard coding techniques such as Discrete Cosine Transforms and quantization methods among others. Subsequently, the coding engine 402 determines an offset vector from the given macroblock to the offset macroblock (referred to as a motion vector). Finally, the coding engine 402 encodes the motion vector. Alternatively, the series of steps may be performed in a different order.

In another embodiment, the coding engine 402 performs a motion estimation on each macroblock to generate at least one motion vector corresponding to each macroblock. In addition, the coding engine 402 performs a mode analysis on each macroblock to designate each macroblock as inter- or intra-coded. For example, if a given macroblock is designated as inter-coded, the given macroblock is referred to as an inter-coded macroblock. Likewise, if the given macroblock is designated as intra-coded, then the given macroblock is referred to as an intra-coded macroblock.

Next, in one embodiment of the invention, the motion wake engine 403 receives the macroblocks from the coding engine 402 and determines which non intra-coded macroblocks are located in motion wake regions of each video frame. Detection of the non intra-coded motion wake region macroblocks via the motion wake engine 403 will be discussed further below in conjunction with FIGS. 5-6.

Upon detection of the non intra-coded motion wake region macroblocks, the motion wake engine 403 may modify coding decisions of the coding engine 402 to aid error concealment applications to clean up visual artifacts associated with errors corresponding to the non intra-coded macroblocks located in the motion wake regions. For example, the motion wake engine 403 may always choose to intra-code macroblocks determined to be in a motion wake. In a second application, the motion wake engine 403 may reduce a quantization parameter (QP). Finally, in a third application, the motion wake engine 403 may reduce the predetermined coding threshold. These error concealment/video improvement applications will be discussed further below in conjunction with FIG. 6. In an alternate embodiment of the invention, functionality of the motion wake engine 403 is incorporated in the coding engine 402 and performed by the coding engine 402. In yet further embodiments, other error concealment applications may be utilized.

In another embodiment of the invention, upon detection of the non intra-coded motion wake region macroblocks by the motion wake engine 403, the coding engine 402 may apply the error concealment/video improvement applications to the detected motion wake region macroblocks.

On a receiving end of the video conference, the coding engine 402 of the image processing engine 310 (FIG. 3) of the remote video conference station 204 (FIG. 2) may use a variety of other error concealment techniques in conjunction with the motion wake engine 403 to improve video quality. For example, in one embodiment of the invention, the coding engine 402 decodes the neighboring macroblocks of a lost inter-coded macroblock, estimates a motion vector of the lost macroblock, and then uses the estimated motion vector to reconstruct data of the lost macroblock. In another embodiment of the present invention, the coding engine 402 may decode the neighboring macroblocks of a lost intra-coded macroblock, and spatially interpolate the decoded neighboring data to reconstruct the lost data. The scope of the present invention covers other error concealment techniques used in conjunction with the motion wake engine 403 to improve video quality due to lost or corrupted macroblocks. Alternatively, the image processing engine 310 (FIG. 3) of the present invention may implement motion wake error concealment techniques via the motion wake engine 403 without any other error concealment techniques to improve video quality.

Once the macroblocks of a given frame are encoded via the coding engine 402 and the motion wake engine 403, the encoded macroblocks are forwarded to the macroblock packetization engine 404. The macroblock packetization engine 404 places the encoded macroblocks into discrete data packets. The packetization process may occur randomly, according to a raster scan order of the given frame, according to error concealment techniques as disclosed by patent application Ser. No. 10/226,504, filed Aug. 23, 2002, entitled "System and Method for Video Error Concealment," which is incorporated herein by reference, or according to any other methods. Typically, more than one encoded macroblock is placed into a given data packet.

Subsequently, the data packets and picture header are forwarded to the communication buffer 406 for transmission across the network 206 (FIG. 2) by the communication interface 312 (FIG. 3). To further promote resilience against packet loss, the picture header may be transmitted more than once per frame.

In another embodiment of the invention, the coding engine 402 may generate an intra-macroblock map that identifies which macroblocks in a coded video frame are intra-coded. After the intra-macroblock map is generated, the image processing engine 310 sends the map to the remote video conference station 204 (FIG. 2). The map may be sent as part of the picture header associated with the coded video frame, for example, although other fields may be used.

Conversely, the image processing engine 310 also processes video data packets received from a remote location and provides video signals for display. Initially, data packets are received by the communication interface 312 (FIG. 3), and forwarded to the communication buffer 406. The data packets are then sent to the macroblock packetization engine 404, which unpacks the macroblocks, and if necessary, orders the macroblocks back into their original, ordered pattern (i.e., pattern prior to macroblock packetization at the remote video conference station 204 (FIG. 2), which is typically raster-scan). Subsequently, the coding engine 402 functions as a decoder by replacing and/or constructing data of a current frame using the intra-coded macroblocks and inter-coded macroblocks from the current frame and previous frames, and determines whether a data packet was lost in transit across the network 206 (FIG. 2). It should further be noted that although the same components are described herein as being used for both transmission and receiving functions, the components may be embodied in separate receiver and transmitter devices.

Figure 5:
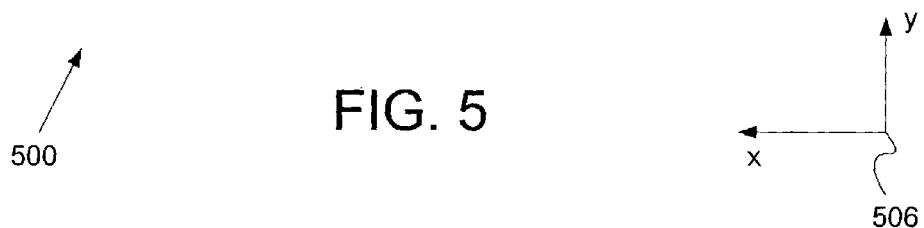
FIG. 5 illustrates motion wake processing of an exemplary macroblock of an exemplary video frame, according to one embodiment of the invention.

FIG. 5 illustrates wake motion processing of an exemplary macroblock 504g of an exemplary video frame 500, according to one embodiment of the present invention. The video frame 500 is a five by seven array of macroblocks, including peripheral macroblocks 502 and non-peripheral macroblocks 504. For descriptive purposes, the non-peripheral macroblocks 504 are also referred to as macroblocks 504. For ease of illustration, the video frame 500 includes only thirty-five macroblocks, although a typical video frame may include more or less macroblocks. For example, the 4CIF formatted video frame (FIG. 1) includes one thousand five hundred and eighty-four macroblocks. The scope of the present invention covers any video frame with any number of macroblocks per video frame. According to the present invention, the motion wake engine 403 (FIG. 4) processes each non-peripheral macroblock 504 to determine which non-peripheral macroblocks 504 are located in motion wake regions of the video frame 500. FIG. 5 also includes an x-y coordinate system 506 for directional reference, although the scope of the invention includes any coordinate system oriented in any manner.

In operation, the motion wake engine 403 determines if the macroblock 504g, for example, is located in a motion wake region of the video frame 500 by first analyzing properties of the macroblock 504g, and then, if necessary, analyzing displacements (i.e., motion vectors) of nearest neighbor macroblocks 504a, 504b, 504c, 504f, 504h, 504k, 504l, and 504m. Specifically, the motion wake engine 403 first analyzes the macroblock 504g for encoding type and motion vector properties. For example, in one embodiment of the present invention, if the motion wake engine 403 determines that the macroblock 504g is intra-coded, or that an absolute value of an x-component of a motion vector associated with the macroblock 504g (referred to as $|MV_x^{504g}|$) is greater than or equal to a predefined x-component motion vector threshold ($MV_x^{max}$), or that an absolute value of a y-component of the motion vector associated with the macroblock 504g (referred to as $|MV_y^{504g}|$) is greater than or equal to a predefined y-component motion vector threshold ($MV_y^{max}$), then the macroblock 504g is determined not to be in a motion wake and the motion wake engine 403 does not process the macroblock 504g further. In one embodiment of the invention, $MV_x^{max}=MV_y^{max}=1$ (pixel), although the scope of the invention covers any x-component motion vector threshold and any y-component motion vector threshold.

In other words, if the motion wake engine 403 determines that a displacement of the macroblock 504g in either an x-direction or a y-direction as measured with respect to a location of the macroblock 504g in a previous reference video frame (not shown) is greater than one pixel, then the macroblock 504g is moving too quickly to be located in any motion wake region of the video frame 500. Alternatively, if the motion wake engine 403 determines that the macroblock 504g is intra-coded, then the motion wake engine 403 does not process the macroblock 504g any further even though the macroblock 504g may or may not be located in any motion wake region of the video frame 500.

However, if the motion wake engine 403 determines that each of the following conditions are true, then the motion wake engine 403 processes the macroblock 504g and the nearest neighbor macroblocks 504a, 504b, 504c, 504f, 504h, 504k, 504l, and 504m to determine if the macroblock 504g is located in any motion wake region of the video frame 500: (1) the macroblock 504g is not intra-coded; (2) the absolute value of the x-component of the motion vector associated with the macroblock 504g is less than the predefined x-component motion vector threshold; and (3) the absolute value of the y-component of the motion vector associated with the macroblock 504g is less than the predefined y-component motion vector threshold. For example, in one embodiment of the invention, the motion wake engine 403 sums x-components of motion vectors associated with the macroblocks 504a, 504f, and 504k to give a "left" sum ($SUM_L$), where the macroblocks 504a, 504f, and 504k are located left of the macroblock 504g. Similarly, the motion wake engine 403 sums y-components of motion vectors associated with the macroblocks 504a, 504b, and 504c located above macroblock 504g to give an "above" sum ($SUM_A$); sums x-components of motion vectors associated with the macroblocks 504c, 504h, and 504m located right of macroblock 504g to give a "right" sum ($SUM_R$); and sums y-components of motion vectors associated with the macroblocks 504k, 504l, and 504m located below macroblock 504g to give a "below" sum ($SUM_B$).

Then, if the motion wake engine 403 determines that the "left" sum $SUM_L$ is greater than a predetermined left sum threshold ($SUM_L^{min}$), and further that all of the macroblocks 504a, 504f, and 504k have first difference displacements, defined as an absolute value of an x-component of displacement (i.e., an x-component of a motion vector) minus the "left" sum ($SUM_L$), that are less than a predetermined "left" difference displacement threshold ($DD_L^{max}$), then the macroblock 504g is determined to be in a first motion wake region created by the macroblocks 504a, 504f, and 504k. In other words, the motion wake engine 403 determines that the macroblock 504g is located in the first wake motion region when at least two macroblocks of the macroblocks 504a, 504f, and 504k have significant displacements in a positive x-direction with respect to an x-displacement of the macroblock 504g.

Specifically, in one embodiment of the invention, given that the macroblock 504g is neither intra-coded or has significant motion, the motion wake engine 403 determines that the macroblock 504g is in the first motion wake region caused by displacement of the macroblocks 504a, 504f, and 504k in the positive x-direction when the following two conditions are true: the "left" sum is greater than a "left" sum threshold ($SUM_L > SUM_L^{min}$), where $SUM_L = MV_x^{504a} + MV_x^{504f} + MV_x^{504k}$; and all of the macroblocks 504a, 504f, and 504k have first difference displacements less than a predetermined "left" difference displacement threshold $DD_L^{max}$, where a first difference displacement of the macroblock 504a is $DD_x^{504a} = |MV_x^{504a} - SUM_L|$, a first difference displacement of the macroblock 504f is $DD_x^{504f} = |MV_x^{504f} - SUM_L|$, and a first difference displacement of the macroblock 504k is $DD_x^{504k} = |MV_x^{504k} - SUM_L|$. For future reference, $(MV_x^{504a} - SUM_L)$, $(MV_x^{504f} - SUM_L)$, and $(MV_x^{504k} - SUM_L)$ are referred to as a first difference of the macroblock 504a, a first difference of the macroblock 504f, and a first difference of the macroblock 504k, respectively.

In another embodiment of the present invention, if $DD_x^{504a} \geq DD_L^{max}$, $DD_x^{504f} \geq DD_L^{max}$, or $DD_x^{504k} \geq DD_L^{max}$, then the motion wake engine 403 sets a "left" flag $FLAG_L = 0$ (i.e., state of $FLAG_L$ is "off"), otherwise the motion wake engine 403 sets the "left" flag $FLAG_L = 1$ (i.e., state of $FLAG_L$ is "on"). The motion wake engine 403 later uses the state of $FLAG_L$ to determine whether the macroblock 504g satisfies one of the conditions for being located in the first motion wake region—that all of the macroblocks 504a, 504f, and 504k have first difference displacements less than the predetermined "left" difference displacement threshold $DD_L^{max}$. In yet another embodiment of the present invention, the "left" sum threshold $SUM_L^{min} = 3$ (pixels) and the "left" difference displacement threshold $DD_L^{max} = 1$ (pixel), although the scope of the invention covers all "left" difference displacement threshold values and "left" sum threshold values. The "left" sum threshold $SUM_L^{min}$ and the "left" difference displacement threshold $DD_L^{max}$ may be stored in the memory 306 (FIG. 3).

Similarly, the motion wake engine 403 determines that the macroblock 504g is located in a second wake motion region when at least two macroblocks of the macroblocks 504a, 504b, and 504c have significant displacements in a positive y-direction with respect to a y-displacement of the macroblock 504g. For example, in one embodiment of the invention, the motion wake engine 403 determines that the macroblock 504g is in the second motion wake region caused by displacement of the macroblocks 504a, 504b, and 504c in the positive y-direction when the following two conditions are true: the "above" sum is greater than an "above" sum threshold ($SUM_A > SUM_A^{min}$), where $SUM_A = MV_y^{504a} + MV_y^{504b} + MV_y^{504c}$; and all of the macroblocks 504a, 504b, and 504c have second difference displacements less than a predetermined "above" difference displacement threshold $DD_A^{max}$, where a second difference displacement of the macroblock 504a is $DD_y^{504a} = |MV_y^{504a} - SUM_A|$, a second difference displacement of the macroblock 504b is $DD_y^{504b} = |MV_y^{504b} - SUM_A|$, and a second difference displacement of the macroblock 504c is $DD_y^{504c} = |MV_y^{504c} - SUM_A|$. For future reference, $(MV_y^{504a} - SUM_A)$, $(MV_y^{504b} - SUM_A)$, and $(MV_y^{504c} - SUM_A)$ are referred to as a second difference of the macroblock 504a, a second difference of the macroblock 504b, and a second difference of the macroblock 504c, respectively.

In another embodiment of the invention, if $DD_y^{504a} \geq DD_A^{max}$, $DD_y^{504b} \geq DD_A^{max}$, or $DD_y^{504c} \geq DD_A^{max}$, then the motion wake engine 403 sets an "above" flag $FLAG_A = 0$, otherwise the motion wake engine 403 sets the "above" flag $FLAG_A = 1$. The motion wake engine 403 later uses the state of $FLAG_A$ to determine whether the macroblock 504g satisfies one of the conditions for being located in the second motion wake region—that all of the macroblocks 504a, 504b, and 504c have second difference displacements less than the predetermined "above" difference displacement threshold $DD_A^{max}$. In yet another embodiment of the invention, $SUM_A^{min} = 3$ (pixels), and $DD_A^{max} = 1$ (pixel). The "above" sum threshold $SUM_A^{min}$ and the "above" difference displacement threshold $DD_A^{max}$ may be stored in the memory 306 (FIG. 3).

Furthermore, the wake motion engine 403 determines that the macroblock 504g is located in a third wake motion region created by motion of the macroblocks 504c, 504h, and 504m in a negative x-direction when at least two macroblocks of the macroblocks 504c, 504h, and 504m have significant displacements in the negative x-direction with respect to an x-displacement of the macroblock 504g. For example, in one embodiment of the invention, the wake motion engine 403 determines that the macroblock 504g is in the third wake region when the following two conditions are true: the "right" sum is less than a "right" sum threshold, $SUM_R < SUM_R^{min}$, where $SUM_R = MV_x^{504c} + MV_x^{504h} + MV_x^{504m}$; and all of the macroblocks 504c, 504h, and 504m have third difference displacements less than a predetermined "right" difference displacement threshold $DD_R^{max}$, where a third difference displacement of the macroblock 504c is $DD_x^{504c} = |MV_x^{504c} - SUM_R|$, a third difference displacement of the macroblock 504h is $DD_x^{504h} = |MV_x^{504h} - SUM_R|$, and a third difference displacement of the macroblock 504m is $DD_x^{504m} = |MV_x^{504m} - SUM_R|$. For future reference, $(MV_x^{504c} - SUM_R)$, $(MV_x^{504h} - SUM_R)$, and $(MV_x^{504m} - SUM_R)$ are referred to as a third difference of the macroblock 504c, a third difference of the macroblock 504h, and a third difference of the macroblock 504m, respectively.

In another embodiment of the invention, if $DD_x^{504c} \geq DD_R^{max}$, $DD_x^{504h} \geq DD_R^{max}$, or $DD_x^{504m} \geq DD_R^{max}$, then the motion wake engine 403 sets a "right" flag $FLAG_R = 0$, otherwise the motion wake engine 403 sets the "right" flag $FLAG_R = 1$. The motion wake engine 403 later uses the state of $FLAG_R$ to determine whether the macroblock 504g satisfies one of the conditions for being located in the third motion wake region—that all of the macroblocks 504c, 504h, and 504m have third difference displacements less than the predetermined "right" difference displacement threshold $DD_R^{max}$. In yet another embodiment of the invention, $SUM_R^{min} = -3$ (pixels), and $DD_R^{max} = 1$ (pixel). The "right" sum threshold $SUM_R^{min}$ and the "right" difference displacement threshold $DD_R^{max}$ may be stored in the memory 306 (FIG. 3).

Finally, the motion wake engine 403 determines that the macroblock 504g is located in a fourth motion wake region created by motion of the macroblocks 504k, 504l, and 504m in a negative y-direction when at least two macroblocks of the macroblocks 504k, 504l, and 504m have significant displacements in the negative y-direction with respect to a y-displacement of the macroblock 504g. For example, in one embodiment of the invention, the motion wake engine 403 determines that the macroblock 504g is in the fourth motion wake region when the following two conditions are true: the "below" sum is less than a "below" sum threshold, $SUM_B < SUM_B^{min}$, where $SUM_B = MV_y^{504k} + MV_y^{504l} + MV_y^{504m}$; and all of the macroblocks 504k, 504l, and 504m have fourth difference displacements less than a predetermined "below" difference displacement threshold $DD_B^{max}$, where a fourth difference displacement of the macroblock 504k is $DD_y^{504k} = |MV_y^{504k} - SUM_B|$, a fourth difference displacement of the macroblock 504l is $DD_y^{504l} = |MV_y^{504l} - SUM_B|$, and a fourth difference displacement of the macroblock 504m is $DD_y^{504m} = |MV_y^{504m} - SUM_B|$. For future reference, $(MV_y^{504k} - SUM_B)$, $(MV_y^{504l} - SUM_B)$, and $(MV_y^{504m} - SUM_B)$ are referred to as a fourth difference of the macroblock 504k, a fourth difference of the macroblock 504l, and a fourth difference of the macroblock 504m, respectively.

In another embodiment of the invention, if $DD_y^{504k} \geq DD_B^{max}$, $DD_y^{504l} \geq DD_B^{max}$, or $DD_y^{504m} \geq DD_B^{max}$, then the motion wake engine 403 sets a "below" flag $FLAG_B = 0$, otherwise the motion wake engine 403 sets the "below" flag $FLAG_B = 1$. The motion wake engine 403 later uses the state of $FLAG_B$ to determine whether the macroblock 504g satisfies one of the conditions for being located in the fourth motion wake region—that all of the macroblocks 504k, 504l, and 504m have fourth difference displacements less than the predetermined "below" difference displacement threshold $DD_B^{max}$. In yet another embodiment of the invention, $SUM_B^{min} = -3$ (pixels), and $DD_B^{max} = 1$ (pixel). The "below" sum threshold $SUM_B^{min}$ and the "below" difference displacement threshold $DD_B^{max}$ may be stored in the memory 306 (FIG. 3).

If the motion wake engine 403 ascertains that the macroblock 504g is in one or more of the first, second, third, or fourth motion wake regions, then the motion wake engine 403 overrides any previous mode decisions generated by the coding engine 402 and intra-codes the macroblock 504g. Intra-coding of the macroblocks 504 located in detected motion wake regions of the video frame 500 eliminates motion prediction errors typically associated with inter-coded macroblocks and particularly noticeable in relatively quiet, slow moving or stationary regions of the video frame 500, such as the detected motion wake regions.

Figure 6:
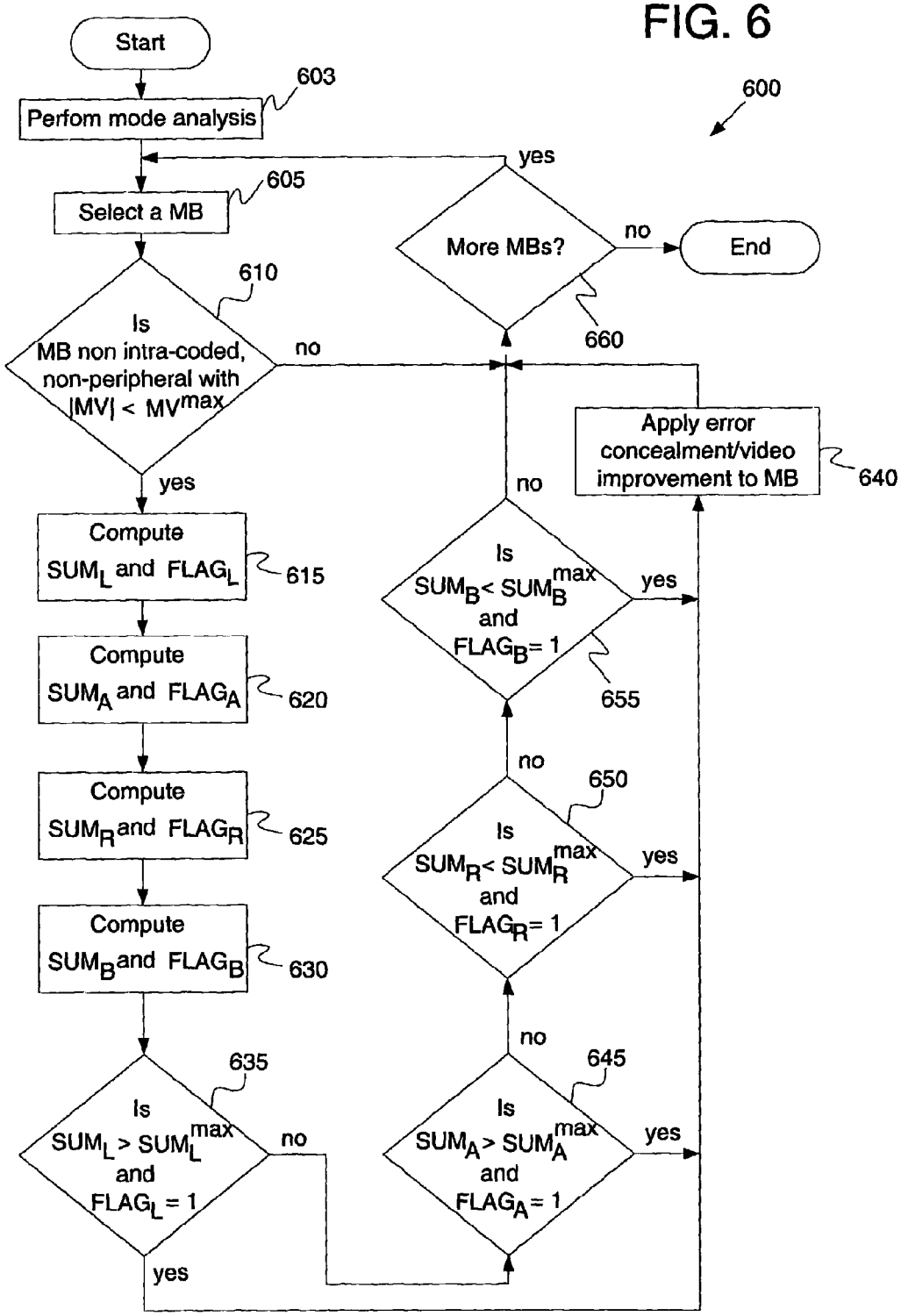
FIG. 6 is an exemplary flowchart of method steps for detecting macroblocks located in motion wake regions of video frames, according to one embodiment of the invention.

FIG. 6 is an exemplary flowchart 600 of method steps for detecting macroblocks located in motion wake regions of video frames, according to one embodiment of the invention. The flowchart 600 will be discussed in connection with the FIG. 5 embodiment of the video frame 500 for illustrative purposes. In step 603, the coding engine 402 (FIG. 4) performs motion estimation and mode analysis on macroblocks of the video frame 500 (FIG. 5). In step 605, the motion wake engine 403 (FIG. 4) receives macroblocks of the video frame 500 from the coding engine 402 and selects a macroblock, such as the macroblock 504g (FIG. 5). In one embodiment, the motion wake engine 403 may preferentially select macroblocks of the video frame 500 that are located in motion wake regions of a previous video frame (not shown) before selecting macroblocks of the video frame 500 that were not located in motion wake regions of the previous video frame. Alternatively, the motion wake engine 403 may select macroblocks in a raster-scan order, according to location in the video frame 500, or randomly. The scope of the present invention includes other methods of selecting macroblocks.

Next, in step 610, if the motion wake engine 403 ascertains that the macroblock 504g is intra-coded, that the macroblock 504g is located on a periphery of the video frame 500, or that a magnitude of a motion vector ($|MV^{504g}|$) associated with the macroblock 504g satisfies the inequality $|MV^{504g}| \geq MV^{max}$, where $MV^{max}$ is a predetermined motion vector threshold, then the motion wake engine 403 does not determine whether the macroblock 504g is located in any motion wake regions of the video frame 500. Subsequently, the method continues at step 660. If, in step 660, the motion wake engine 403 determines that all the encoded macroblocks have been selected, then the method ends. However, if in step 660, the motion wake engine 403 ascertains that not all the encoded macroblocks have been selected, then the method continues at step 605.

Referring back to step 610, if the motion wake engine 403 determines that the macroblock 504g is a non intra-coded, non-peripherally located macroblock with a motion vector magnitude $|MV^{504g}| < MV^{max}$, then further analysis is required to determine if the macroblock 504g is located in any motion wake regions of the video frame 500. Subsequently, the method continues at step 615.

In step 615, the motion wake engine 403 computes a "left" sum ($SUM_L$) and a "left" flag ($FLAG_L$) associated with the nearest neighbor macroblocks (i.e., 504a, 504f, 504k, (FIG. 5)) located to the left (i.e., in a positive x-direction, according to the x-y coordinate system 506 of FIG. 5) of the macroblock 504g. In one embodiment of the invention, $SUM_L = MV_x^{504a} + MV_x^{504f} + MV_x^{504k}$, where, for example, $MV_x^{504a}$ is an x-component of a motion vector associated with the macroblock 504a and so forth. In order to compute $FLAG_L$, the motion wake engine 403 first computes $DD_x^{504a} = |MV_x^{504a} - SUM_L|$, $DD_x^{504f} = |MV_x^{504f} - SUM_L|$, and $DD_x^{504k} = |MV_x^{504k} - SUM_L|$. Then, if the motion wake engine 403 determines that $DD_x^{504a} < DD_L^{max}$, $DD_x^{504f} < DD_L^{max}$, and $DD_x^{504k} < DD_L^{max}$, where $DD_L^{max}$ is a predetermined "left" difference displacement threshold, then the motion wake engine 403 sets $FLAG_L=1$. Alternatively, if $DD_x^{504a} \geq DD_L^{max}$, $DD_x^{504f} \geq DD_L^{max}$, or $DD_x^{504k} \geq DD_L^{max}$, then wake engine 403 sets $FLAG_L=0$.

Next, in step 620, the motion wake engine 403 computes an "above" sum ($SUM_A$) and an "above" flag ($FLAG_A$) associated with the nearest neighbor macroblocks (i.e., 504a, 504b, 504c, (FIG. 5)) located above (i.e., in a positive y-direction, according to the x-y coordinate system 506) the macroblock 504g. In one embodiment of the invention, $SUM_A=MV_y^{504a}+MV_y^{504b}+MV_y^{504c}$, where, for example, $MV_y^{504a}$ is a y-component of a motion vector associated with the macroblock 504a. In order to compute $FLAG_A$, the motion wake engine 403 first computes $DD_y^{504a}=|MV_y^{504a}-SUM_A|$, $DD_y^{504b}=|MV_y^{504b}-SUM_A|$, and $DD_y^{504c}=|MV_y^{504c}-SUM_A|$. Then, if the motion wake engine 403 determines that $DD_y^{504a}<DD_A^{max}$, $DD_y^{504b}<DD_A^{max}$, and $DD_y^{504c}<DD_A^{max}$, where $DD_A^{max}$ is a predetermined "above" difference displacement threshold, then the motion wake engine 403 sets $FLAG_A=1$. Alternatively, if $DD_y^{504a} \geq DD_A^{max}$, $DD_y^{504b} \geq DD_A^{max}$, or $DD_y^{504c} \geq DD_A^{max}$, then the motion wake engine 403 sets $FLAG_A=0$.

Subsequently, in step 625, the motion wake engine 403 computes a "right" sum ($SUM_R$) and a "right" flag ($FLAG_R$) associated with the nearest neighbor macroblocks (i.e., 504c, 504h, 504m, (FIG. 5)) located to the right (i.e., in a negative x-direction, according to the x-y coordinate system 525) of the macroblock 504g. In one embodiment of the invention, $SUM_R=MV_x^{504c}+MV_x^{504h}+MV_x^{504m}$, where, for example, $MV_x^{504c}$ is an x-component of a motion vector associated with the macroblock 504c. In order to compute $FLAG_R$, the motion wake engine 403 first computes $DD_x^{504c}=|MV_x^{504c}-SUM_R|$, $DD_x^{504h}=|MV_x^{504h}-SUM_R|$, and $DD_x^{504m}=|MV_x^{504m}-SUM_R|$. Then, if the motion wake engine 403 determines that $DD_x^{504c}<DD_R^{max}$, $DD_x^{504h}<DD_R^{max}$, and $DD_x^{504m}<DD_R^{max}$, where $DD_R^{max}$ is a predetermined "right" difference displacement threshold, then the motion wake engine 403 sets $FLAG_R=1$. Alternatively, if $DD_x^{504c} \geq DD_R^{max}$, $DD_x^{504h} \geq DD_R^{max}$, or $DD_x^{504m} \geq DD_R^{max}$, then the motion wake engine 403 sets $FLAG_R=0$.

Further, in step 630, the motion wake engine 403 computes a "below" sum ($SUM_B$) and a "below" flag ($FLAG_B$) associated with the nearest neighbor macroblocks (i.e., 504k, 504l, 504m, (FIG. 5)) located below (i.e., in a negative y-direction, according to the x-y coordinate system 506) the macroblock 504g. In one embodiment of the invention, $SUM_B=MV_y^{504k}+MV_y^{504l}+MV_y^{504m}$, where, for example, $MV_y^{504k}$ is a y-component of a motion vector associated with the macroblock 504k. In order to compute $FLAG_B$, the motion wake engine 403 first computes $DD_y^{504k}=|MV_y^{504k}-SUM_B|$, $DD_y^{504l}=|MV_y^{504l}-SUM_B|$, and $DD_y^{504m}=|MV_y^{504m}-SUM_B|$. Then, if the motion wake engine 403 determines that $DD_y^{504k}<DD_B^{max}$, $DD_y^{504l}<DD_B^{max}$, and $DD_y^{504m}<DD_B^{max}$, where $DD_B^{max}$ is a predetermined "below" difference displacement threshold, then the motion wake engine 403 sets $FLAG_B=1$. Alternatively, if $DD_y^{504k} \geq DD_B^{max}$, $DD_y^{504l} \geq DD_B^{max}$, or $DD_y^{504m} \geq DD_B^{max}$, then the motion wake engine 403 sets $FLAG_B=0$.

Once all the FLAGs have been determined, the motion wake engine 403 determines if $SUM_L \geq SUM_L^{min}$ and $FLAG_L=1$, where $SUM_L^{min}$ is a predetermined "left" sum threshold, in step 635. In one embodiment of the invention, $SUM_L^{max}=3$ (pixels). If $SUM_L \geq SUM_L^{min}$ and $FLAG_L=1$, then the macroblock 504g is located in a first motion wake region of the video frame 500, and in step 640, the motion wake engine 403 applies one or more error concealment/video improvement applications to the macroblock 504g. The method continues at step 660. In an alternate embodiment of the invention, step 640 is bypassed, and the method continues at step 660.

Referring to step 640, in a first error concealment/video improvement application, the motion wake engine 403 overrides any previous mode decisions generated by the coding engine 402 and intra-codes the macroblock 504g. In a second application, the motion wake engine 403 reduces the quantization parameter (QP) associated with the macroblock 504g. Reducing the QP results in a more accurate spectral representation of the macroblock 504g's contents, resulting in a further reduction of any visual artifacts. Alternatively, in a third application, the motion wake engine 403 reduces the coding threshold associated with the macroblock 504g.

Referring back to step 635, if the motion wake engine 403 ascertains that $SUM_L \leq SUM_L^{min}$ and/or $FLAG_L=0$, then in step 645, the motion wake engine 403 determines if the macroblock 504g is located in a second motion wake region created by motion of the macroblocks 504a, 504b, and 504c. For example, if the motion wake engine 403 determines that $SUM_A > SUM_A^{min}$ and $FLAG_A=1$, where $SUM_A^{min}$ is a predetermined "above" sum threshold, then the macroblock 504g is located in the second motion wake region of the video frame 500, and the method continues at step 640. In one embodiment of the invention, $SUM_A^{min}=3$ (pixels), although the scope of the invention covers any value of $SUM_A^{Min}$.

However, if in step 645 the motion wake engine 403 ascertains that $SUM_A \leq SUM_A^{min}$ and/or $FLAG_A=0$, then in step 650, the motion wake engine 403 determines if the macroblock 504g is located in a third motion wake region created by motion of the macroblocks 504c, 504h, and 504m. For example, if the motion wake engine 403 determines that $SUM_R < SUM_R^{min}$ and $FLAG_R=1$, where $SUM_R^{min}$ is a predetermined "right" sum threshold, then the macroblock 504g is located in the third motion wake region of the video frame 500, and the method continues at step 640. In one embodiment of the invention, $SUM_R^{min}=-3$ (pixels), although the scope of the invention covers any value of $SUM_R^{min}$.

However, if in step 650 the motion wake engine 403 ascertains that $SUM_R \geq SUM_R^{min}$ and/or $FLAG_R=0$, then in step 655, the motion wake engine 403 determines if the macroblock 504g is located in a fourth motion wake region created by motion of the macroblocks 504k, 504l, and 504m. For example, if the motion wake engine 403 determines that $SUM_B < SUM_B^{min}$ and $FLAG_B=1$, where $SUM_B^{min}$ is a predetermined "below" sum threshold, then the macroblock 504g is located in the fourth motion wake region of the video frame 500, and the method continues at step 640. In one embodiment of the invention, $SUM_B^{min}=-3$ (pixels), although the scope of the invention covers any value of $SUM_B^{min}$.

However, if in step 655 the motion wake engine 403 ascertains that $SUM_B \geq SUM_B^{min}$ and/or $FLAG_B=0$, then the macroblock 504g is not located in any wake motion region of the video frame 500, and the method continues at step 660. In step 660, the motion wake engine 403 determines if all the encoded macroblocks have been selected for motion wake analysis. If all the encoded macroblocks have not been selected, then the method continues at step 605. However, if all the encoded macroblocks have been selected, then the method ends.

The invention has been explained above with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method for detecting motion wake regions of video frames, comprising the steps of:
   receiving macroblocks of a video frame from a coding engine;
   selecting a subset of macroblocks from the received macroblocks based upon macroblock properties; and
   determining if a macroblock of the subset of macroblocks is located in any motion wake regions of the video frame based upon an analysis of motion vectors associated with nearest neighbor macroblocks.

2. The method of claim 1, wherein the step of selecting a subset of macroblocks further comprises the step of selecting non-peripherally located macroblocks with motion vector magnitudes less than a predetermined motion vector threshold that the coding engine has selected to inter-code.

3. The method of claim 1, wherein the coding engine performs motion estimation and mode decisions for each macroblock prior to the step of receiving macroblocks.

4. The method of claim 3, further comprising the step of generating one or more motion vectors for each macroblock.

5. The method of claim 2, wherein the predetermined motion vector threshold is one pixel.

6. The method of claim 1, wherein the macroblock of the subset of macroblocks is located in a first motion wake region of the video frame if at least two of the nearest neighbor macroblocks located in a positive x-direction with respect to the macroblock have significant displacements in the positive x-direction with respect to an x-displacement of the macroblock.

7. The method of claim 1, wherein the macroblock of the subset of macroblocks is located in a second motion wake region of the video frame if at least two of the nearest neighbor macroblocks located in a positive y-direction with respect to the macroblock have significant displacements in the positive y-direction with respect to a y-displacement of the macroblock.

8. The method of claim 1, wherein the macroblock of the subset of macroblocks is located in a third motion wake region of the video frame if at least two of the nearest neighbor macroblocks located in a negative x-direction with respect to the macroblock have significant displacements in the negative x-direction with respect to an x-displacement of the macroblock.

9. The method of claim 1, wherein the macroblock of the subset of macroblocks is located in a fourth motion wake region of the video frame if at least two of the nearest neighbor macroblocks located in a negative y-direction with respect to the macroblock have significant displacements in the negative y-direction with respect to a y-displacement of the macroblock.

10. The method of claim 1, wherein the step of determining further comprises the steps of:
    summing x-components of motion vectors associated with a subset of the nearest neighbor macroblocks located in a positive x direction with respect to the macroblock of the subset of macroblocks to give a "left" $SUM_L$;
    subtracting the "left" $SUM_L$ from an x-component of a motion vector associated with each nearest neighbor macroblock of the subset of the nearest neighbor macroblocks to give first differences, and taking an absolute value of each of the first differences to give a first difference displacement for each of the nearest neighbor macroblocks of the subset of nearest neighbor macroblocks; and
    determining that the macroblock of the subset of macroblocks is located in a first motion wake region of the video frame if the "left" $SUM_L$ is greater than a predetermined "left" sum threshold and if all of the first difference displacements are less than a "left" difference displacement threshold.

11. The method of claim 1, wherein the step of determining further comprises the steps of:
    summing y-components of motion vectors associated with a subset of the nearest neighbor macroblocks located in a positive y direction with respect to the macroblock of the subset of macroblocks to give an "above" $SUM_A$;
    subtracting the "above" $SUM_A$ from a y-component of a motion vector associated with each nearest neighbor macroblock of the subset of the nearest neighbor macroblocks to give second differences, and taking an absolute value of each of the second differences to give a second difference displacement for each of the nearest neighbor macroblocks of the subset of nearest neighbor macroblocks; and
    determining that the macroblock of the subset of macroblocks is located in a second motion wake region of the video frame if the "above" $SUM_A$ is greater than a predetermined "above" sum threshold and if all of the second difference displacements are less than an "above" difference displacement threshold.

12. The method of claim 1, wherein the step of determining further comprises the steps of:
    summing x-components of motion vectors associated with a subset of the nearest neighbor macroblocks located in a negative x direction with respect to the macroblock of the subset of macroblocks to give a "right" $SUM_R$;
    subtracting the "right" $SUM_R$ from an x-component of a motion vector associated with each nearest neighbor macroblock of the subset of the nearest neighbor macroblocks to give third differences, and taking an absolute value of each of the third differences to give a third difference displacement for each of the nearest neighbor macroblocks of the subset of nearest neighbor macroblocks; and
    determining that the macroblock of the subset of macroblocks is located in a third motion wake region of the video frame if the "right" $SUM_R$ is less than a predetermined "right" sum threshold and if all of the third difference displacements are less than a "right" difference displacement threshold.

13. The method of claim 1, wherein the step of determining further comprises the steps of:
    summing y-components of motion vectors associated with a subset of the nearest neighbor macroblocks located in a negative y direction with respect to the macroblock of the subset of macroblocks to give a "below" $SUM_B$;
    subtracting the "below" $SUM_B$ from a y-component of a motion vector associated with each nearest neighbor macroblock of the subset of the nearest neighbor macroblocks to give fourth differences, and taking an absolute value of each of the fourth differences to give a fourth difference displacement for each of the nearest neighbor macroblocks of the subset of nearest neighbor macroblocks; and
    determining that the macroblock of the subset of macroblocks is located in a fourth motion wake region of the video frame if the "below" $SUM_B$ is less than a predetermined "below" sum threshold and if all of the fourth difference displacements are less than a "below" difference displacement threshold.

14. The method of claim 1, further comprising the step of intra-coding macroblocks determined to be located in any motion wake regions of the video frame for video error concealment.

15. The method of claim 1, further comprising the step of reducing a quantization parameter (QP) associated with macroblocks determined to be located in any motion wake regions of the video frame for improving video frame quality.

16. The method of claim 1, further comprising the step of reducing a coding threshold associated with macroblocks determined to be located in any motion wake regions of the video frame for improving video frame quality.

17. An electronic-readable medium having embodied thereon a program, the program being executable by a machine to perform method steps for detecting video frame motion wake regions, the method steps comprising:
receiving macroblocks of a video frame from a coding engine;
selecting a subset of macroblocks from the received macroblocks based upon macroblock properties; and
determining if a macroblock of the subset of macroblocks is located in any motion wake regions of the video frame based upon an analysis of motion vectors associated with nearest neighbor macroblocks.

18. The electronic-readable medium of claim 17, wherein the step of selecting a subset of macroblocks further comprises the step of selecting non-peripherally located macroblocks with motion vector magnitudes less than a predetermined motion vector threshold that the coding engine has selected to inter-code.

19. The electronic-readable medium of claim 17, wherein the macroblock of the subset of macroblocks is located in a first motion wake region of the video frame if at least two of the nearest neighbor macroblocks located in a positive x-direction with respect to the macroblock have significant displacements in the positive x-direction with respect to an x-displacement of the macroblock.

20. The electronic-readable medium of claim 17, wherein the macroblock of the subset of macroblocks is located in a second motion wake region of the video frame if at least two of the nearest neighbor macroblocks located in a positive y-direction with respect to the macroblock have significant displacements in the positive y-direction with respect to a y-displacement of the macroblock.

21. The electronic-readable medium of claim 17, wherein the macroblock of the subset of macroblocks is located in a third motion wake region of the video frame if at least two of the nearest neighbor macroblocks located in a negative x-direction with respect to the macroblock have significant displacements in the negative x-direction with respect to an x-displacement of the macroblock.

22. The electronic-readable medium of claim 17, wherein the macroblock of the subset of macroblocks is located in a fourth motion wake region of the video frame if at least two of the nearest neighbor macroblocks located in a negative y-direction with respect to the macroblock have significant displacements in the negative y-direction with respect to a y-displacement of the macroblock.

23. The electronic-readable medium of claim 17, further comprising the step of intra-coding macroblocks determined to be located in any motion wake regions of the video frame for video error concealment.

24. The electronic-readable medium of claim 17, further comprising the step of reducing a quantization parameter (QP) associated with the macroblocks determined to be located in any motion wake regions of the video frame for improving video quality.

25. The electronic-readable medium of claim 17, further comprising the step of reducing a coding threshold associated with the macroblocks determined to be located in any motion wake regions of the video frame for improving video quality.

26. A system for video frame motion wake detection, comprising:
a coding engine configured to process each frame of a video signal to generate macroblocks, and encode the macroblocks as intra-coded and inter-coded macroblocks; and
a motion wake engine configured to detect which encoded macroblocks are located in motion wake regions of each frame.

27. The system of claim 26, wherein the motion wake engine is further configured to determine which non-peripherally located macroblocks with motion vector magnitudes less than a predetermined motion vector threshold that the coding engine has selected to inter-code are located in motion wake regions of each frame.

28. The system of claim 26, wherein the motion wake engine is further configured to determine whether a given encoded macroblock is located in a first motion wake region by determining if at least two nearest neighbor macroblocks located in a positive x-direction with respect to the given encoded macroblock have significant displacements in the positive x-direction with respect to an x-displacement of the given encoded macroblock.

29. The system of claim 26, wherein the motion wake engine is further configured to determine whether a given encoded macroblock is located in a second motion wake region by determining if at least two nearest neighbor macroblocks located in a positive y-direction with respect to the given encoded macroblock have significant displacements in the positive y-direction with respect to a y-displacement of the given encoded macroblock.

30. The system of claim 26, wherein the motion wake engine is further configured to determine whether a given encoded macroblock is located in a third motion wake region by determining if at least two nearest neighbor macroblocks located in a negative x-direction with respect to the given encoded macroblock have significant displacements in the negative x-direction with respect to an x-displacement of the given encoded macroblock.

31. The system of claim 26, wherein the motion wake engine is further configured to determine whether a given encoded macroblock is located in a fourth motion wake region by determining if at least two nearest neighbor macroblocks located in a negative y-direction with respect to the given encoded macroblock have significant displacements in the negative y-direction with respect to a y-displacement of the given encoded macroblock.

32. The system of claim 27, wherein the motion wake engine is further configured to intra-code macroblocks detected in one or more motion wake regions of each frame for video error concealment.

33. A system for detecting motion wake regions of video frames, comprising:
means for receiving macroblocks of a video frame from a coding engine;
means for selecting a subset of macroblocks from the received macroblocks based upon macroblock properties; and
means for determining if a macroblock of the subset of macroblocks is located in any motion wake regions of the video frame based upon an analysis of motion vectors associated with nearest neighbor macroblocks.

* * * * *